Figure 1:
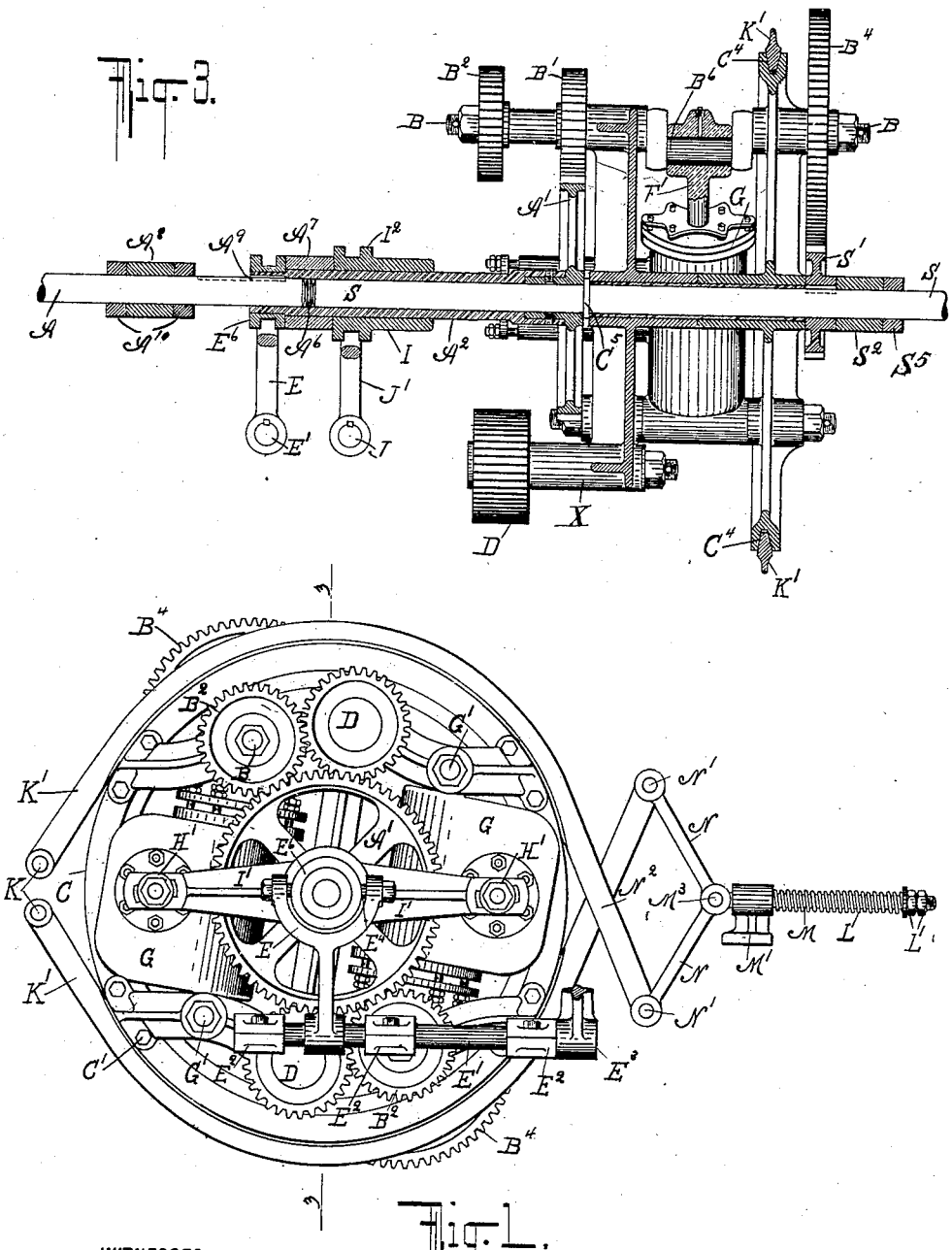

R. E. LINCOLN.
SPEED CHANGING GEAR.
APPLICATION FILED MAY 7, 1908.

917,624.

Patented Apr. 6, 1909.
3 SHEETS—SHEET 2.

WITNESSES:

INVENTOR
Robert E. Lincoln

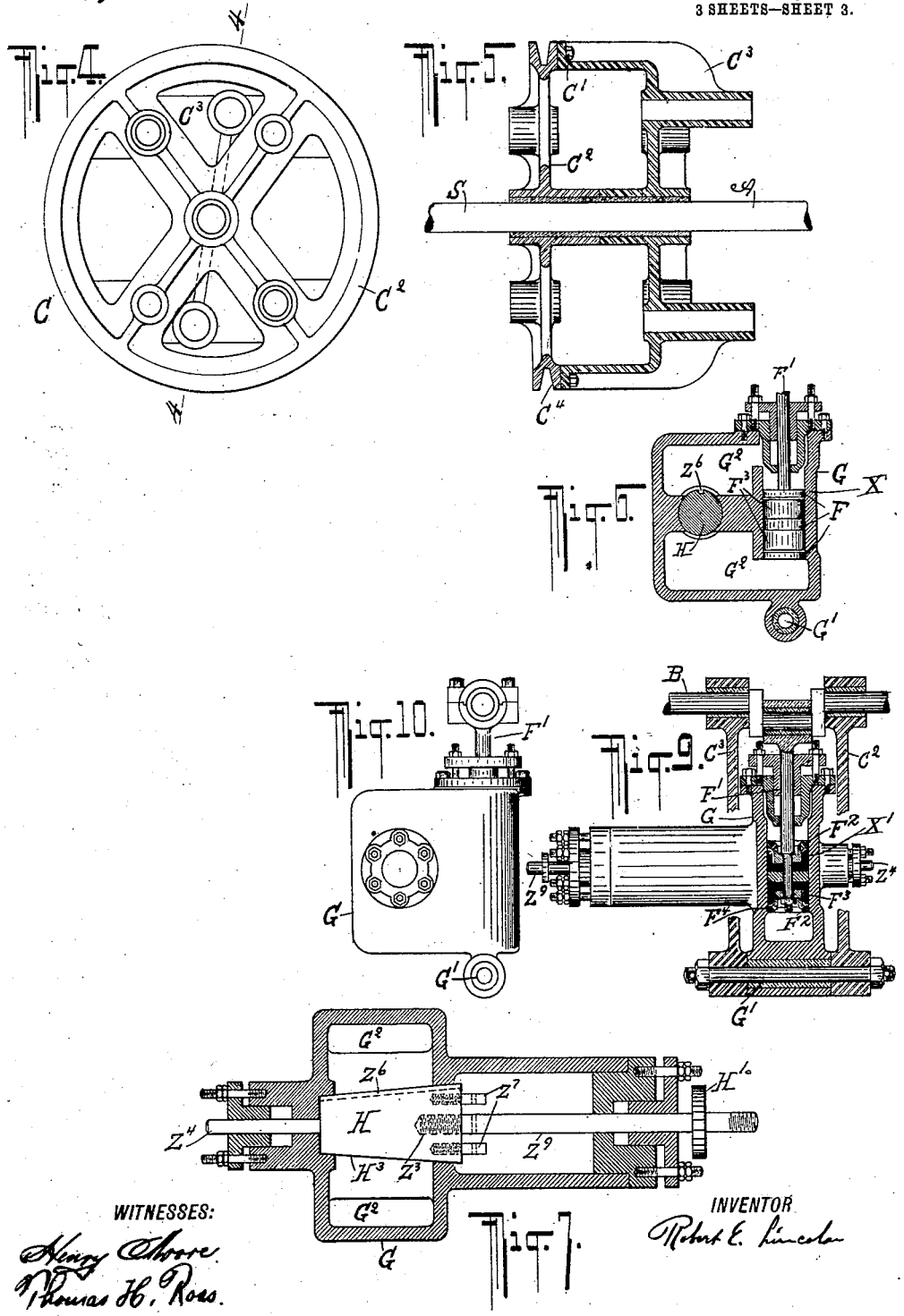

UNITED STATES PATENT OFFICE.

ROBERT E. LINCOLN, OF JERSEY CITY, NEW JERSEY.

SPEED-CHANGING GEAR.

No. 917,624.　　　　Specification of Letters Patent.　　　　Patented April 6, 1909.

Application filed May 7, 1908. Serial No. 431,528.

*To all whom it may concern:*

Be it known that I, ROBERT E. LINCOLN, a citizen of the United States, and a resident of Jersey City, Hudson county, State of New Jersey, have invented certain new and useful Improvements in Speed-Changing Gears, of which the following is a specification.

My invention relates to a transmission system particularly for use in automobiles and similar apparatus where wide variations of speed are required between the driving member or prime mover and the driven member or parts.

It is the particular object of my invention to provide for changes in the speed ration or power factor by a gradual and perfectly elastic variation, changing from one value to another by the manipulation of an operating lever without any shock whatever.

As above stated I have had particularly in mind the requirements of the service in automobiles and motor vehicles, and which I believe are all perfectly satisfied and accomplished by the present invention.

In order to make the principles of the invention clear I will briefly refer to the requirements of automobile service, in which, so far as I am aware, no perfectly satisfactory transmission system has as yet been attained. The usual motor vehicle has an explosion engine for the prime mover or driving member, and from this the power is transmitted through a transmission system to the rear axle. For normal use the engine should operate through a direct drive without any intermediate gearing except the usual differential. This direct drive is employed under all running conditions of the car except starting and climbing particularly steep hills or under muddy or adverse road conditions. In these last named cases a reduction gearing of some sort is interposed in the transmission system, and this is done in practice by forms of sliding and planetary gears. The planetary gear transmission system has many objections and has been generally substituted by the sliding gear transmission system which answers every requirement except that the gear-shift can be made only by expert manipulation, is difficult, noisy and troublesome, and exceedingly likely to strip off the gear teeth. In fact a gear shift with the ordinary sliding gear can hardly be made without inflicting a perfectly definite damage on the gears, which lessens their life a perfectly definite amount.

It is the purpose of my invention to obtain substantially all the advantages and characteristics of the standard sliding gear, including a direct drive at high speeds, a reduction through spur gears and a single countershaft, and an adequate number of speeds, including the reverse; and in addition to overcome the above noted defects of the sliding gear. With this object in view I have provided a mechanism in which the variations from one speed ratio or power factor to another are accomplished with a perfect elasticity of control, passing from one speed ratio to another through an indefinite number of intermediate gradations or stages, so that an ideal control is made possible.

My invention consists in the features of construction and combination as hereinafter set forth and claimed.

Figure 2:
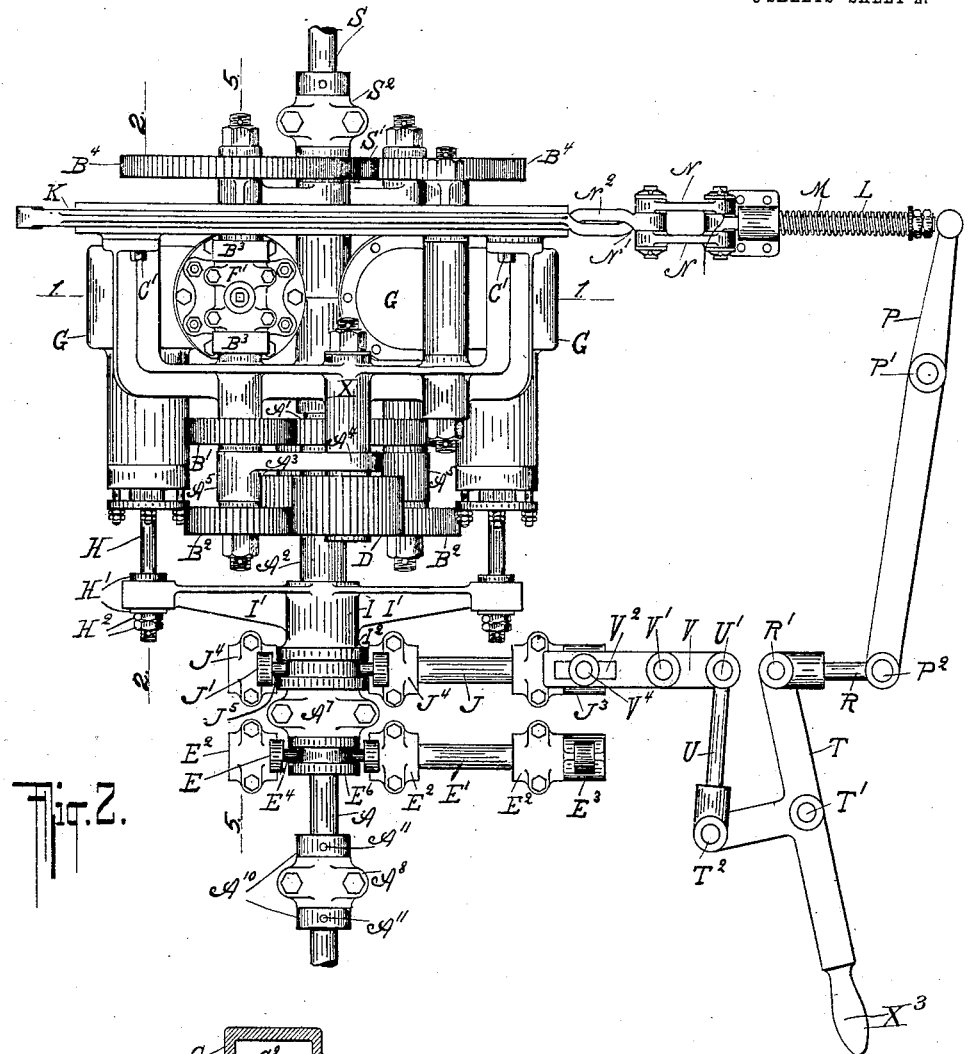
Figure 8:
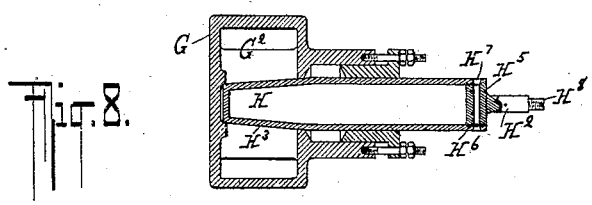
Figure 11:
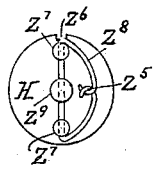

In the drawings: Figure 1 is an end elevation of a transmission system embodying the principles of my invention. Fig. 2 is a top plan view. Fig. 3 is a vertical section on line 3—3 of Fig. 1. Fig. 4 is a detail end view on a slightly reduced scale of the main frame member or casting. Fig. 5 is a vertical section or view of the same on the line 4—4 of Fig. 4. Fig. 6 is a detail partial sectional view on the line 1—1 of Fig. 2. Fig. 7 is a section on the line 2—2 of Fig. 2. Fig. 8 is a similar view showing a slight modification of the valve structure. Fig. 9 is a section on the line 5—5 of Fig. 2. Fig. 10 is a side view of the parts shown in Fig. 9. Fig. 11 is a detail view looking toward the right-hand end of the valve member "H" in Fig. 7.

Referring to the drawing in which like parts are designated by the same reference sign, "S" designates the driving, and A the driven shaft, which are in alinement with one another, and have their adjacent ends separated by a washer or similar anti-friction device $A^6$. Loosely sleeved upon the driving shaft S is a frame C composed of two parts $C^2$ and $C^3$, bolted together by screws $C^1$, as shown in Fig. 5. This frame carries the counter or transmission shafts and gears through which power is transmitted for all speeds except the direct drive. All of the parts of the transmission system are arranged in duplicate on diametrically opposite sides of the frame C, and I shall therefore refer only to the mechanism on one side in order to make the description clear.

$S^1$ designates a pinion fixed to the driving shaft.

$A^1$ designates a gear fixed to a sleeve $A^2$, which is splined upon the driven shaft at $A^9$. Meshing with the gears $A^1$ and $S^1$ are gears $B^2$ and $B^4$ which are both fixed upon the counter-shaft B, revolving in bearings respectively formed in the frame parts $C^2$ and $C^3$. In this way a gear train is established through which power is transmitted from the driving to the driven shaft at a reduced speed ratio depending upon the sizes of the various gears. In practice I make this gear ratio correspond to the lowest speed at which an automobile is required to be driven, and corresponding to the highest required power factor. It is to be noted that the power is transmitted through this gear train as above described when the frame C is fixed against rotation, while the counter-shaft B rotates freely within its journals. These conditions are effected when the low gear is in action, but for intermediate gear ratios and for the direct drive these conditions are both partially or completely altered as will later more fully appear.

For the reverse drive, I make use of a separate gear $B^2$ on the countershaft B, and which is permanently in mesh with a comparatively broad pinion D (see particularly Fig. 2). Pinion D rotates idly on a stud or boss X, forming part of the frame C, and constitutes an idler which may be engaged by the gear $A^1$ when the latter is shifted longitudinally by its sleeve $A^2$. Under these circumstances the gear $A^1$ ceases to mesh with gear $B^1$, and the train is established through gears $B^2$, D and $A^1$ which obviously produce a reverse rotation of the driven shaft. The amount of longitudinal movement of gear $A^1$ in shifting to reverse drive is of course not sufficient to cause it to mesh with the pinion $B^2$, but only with the adjacent portion of the broad idler D (see Fig. 2).

In order to stiffen the reversing gear $B^2$ during its action, I provide links or arms $A^3$ embracing the countershafts B between the gears $B^1$ and $B^2$ and connected to the frame C at the studs X previously mentioned.

I have referred to the fact that during the slowest speed forward, corresponding to the very low gear, that the frame C was held against rotation and the countershafts B revolved freely. On the other hand, for a direct drive or highest speed, the frame C revolves freely while the countershafts B are locked against rotation. For the last named purpose each countershaft has an offset or crank portion $B^6$ with a pitman connection $F^1$ to a piston F (see Figs. 6 and 9) which has a longitudinal movement in a cylinder $X^1$ forming part of a completely inclosed box G, which is normally filled with a liquid such as oil or a water compound having lubricating qualities. The box G rocks or oscillates on a pivot support $G^1$ extending between the frame parts $C^2$ and $C^3$. The cylinder $X^1$ is in communication at its ends with chambers $G^2$ of the box G, but these chambers have no communication with one another except through a valve H, which may be completely closed. It is evident that when this valve is completely closed the piston F is locked against longitudinal movement, and the corresponding countershaft B prevented from rotation. Under these circumstances, assuming that the frame C is free to rotate with the shaft S, it will be evident that the power is transmitted from the driving to the driven shaft by a direct drive, equivalent to a clutch connection. The torque of the driving transmission is applied through the various gears $S^1$, $B^4$, $B^1$ and $A^1$, the turning movement of the countershaft B being resisted by the liquid in the box G as above described. If the valve H is slightly open, the shaft B will be permitted to turn slowly. Under these circumstances the full speed of the shaft S is not transmitted to the driven shaft A. The amount of the speed reduction may be adjusted to any value desired by regulating the opening of the valve H; if the valve H is entirely open so that the countershaft B revolves perfectly freely, the speed reduction will be infinite, that is to say the rotation of the driven shaft will be reduced to zero. By varying the position of the valve H to intermediate stages, any intermediate value of speed reduction between direct drive and entire stoppage, may be obtained. It is evident, therefore, that an ideal variability of the speed ratio is effected by my present transmission system.

The rotation of the frame C under the above conditions is ordinarily in the same direction as the shaft S but at a slower speed. The particular speed at which the frame C rotates is indeterminate, since it depends partly upon the freedom of rotation of the countershaft C and partly on the resistance against rotation opposed to the driven shaft A. If the latter becomes sufficiently great it might happen that a tendency to reverse rotation may be imparted to the frame C. In such cases, however, I provide means for resisting reverse rotation of the frame C whereby adequate driving torque is obtained for any possible conditions, amounting to the highest power factor of the reduction gear used. For this purpose I have illustrated in the drawings an ordinary brake band $K^1$ located in a circumferentially grooved wheel $C^4$ of the frame C. When this brake band is tightened in a manner later described, the frame C is locked against rotation movement.

The means which I have shown for varying the opening of the valves H comprises a yoke $I^1$ having a hub I longitudinally slidable on the sleeve $A^2$, the yoke being connected to the stems $Z^9$ of the valves H by collars $H^1$ and nuts $H^2$. I make use of a conical valve H fitting in a correspondingly coned recess of the box G between the chambers $G^2$ thereof, so that a space between the chambers is created when the valves H are moved to the right in Fig. 7. In order to fix the adjustment of the valves H on their stems $Z^9$ I provide a pair of studs $Z^7$ with holes in alinement with a transverse hole through rod $Z^9$ and through all of which holes a wire $Z^8$ may be passed and twisted at $Z^5$ to prevent its working loose.

Referring now to Fig. 2, I have shown means for securing the various functions of the transmission gear by a single system of levers. $E^1$ designates a rock shaft journaled in bearings $E^2$ and having rock arms $E^4$ engaging a grooved collar $E^6$ forming part of the sleeve $A^2$. J designates a similar rock shaft journaled in bearings $J^4$, and having rock arms $J^5$, engaging a grooved collar $I^2$ forming part of the yoke I. Both of the rock shafts $E^1$ and J have offset crank arms $E^3$ and $J^3$ respectively. V designates a lever pivoted at $V^1$ and having a slot $V^2$ in which is received a pin $V^4$ of the crank arm $J^3$. The lever V is shifted by a link connection U from a pin $T^2$ forming part of the bell crank lever T pivoted at $T^1$. P designates another lever pivoted at $P^1$, and having a link connection R from its extremity $P^2$ to a pin $R^1$ forming part of the bell crank T. The lever P has a rod connection M with links N connected at $N^1$ with the extremities $N^2$ of the brake bands $K^1$, which are pivoted at K on the opposite side of the brake wheel. When the rod M is pushed inward the brake bands are tightened, and conversely. The brake bands are normally impelled into their loosened relation by a spring L.

The use and operation is as follows: When parts are in the relation shown in Fig. 2 the valves H are only partially open and the transmission is accomplished with a slight reduction in the speed ratio. At this time the brake bands $K^1$ are substantially loose on the drum $C^2$. When the bell crank lever T is swung right-handedly in Fig. 2 (by moving the handle $X^3$ to the left) the valves H are opened and the brake bands $K^1$ are tightened on the brake drum. This condition corresponds to the lowest forward speed at the highest power factor. A reverse drive may be secured at this time by shifting the rock arm $E^3$ downward in Fig. 2, which slides the gear $A^1$ longitudinally and effects a reverse, as already described. When the handle $X^3$ of the bell crank lever T is swung to the right, the brake bands $K^1$ are first released, and the valves H thereafter moved toward their closed positions. This corresponds to a progressively higher gear until a direct drive is attained, as has been above described. The above speed transmission mechanism is particularly suitable to automobiles since it fully answers the requirements for starting the vehicle from a state of rest, and in climbing a hill under adverse road conditions, which are the only circumstances where a change of gear is ordinarily required. In the case of hill climbing it is obvious that the machine may be run from a low to a high gear during the climbing of the hill, which is an impossibility with the present sliding gears. The change is of course always effected without shock or jar and without requiring any care, or the skilled manipulation which is so essential with the present sliding gears.

In the practical carrying out of my invention I have embodied a number of features to make the system particularly efficient and durable and easily controlled. Among these features may be mentioned the arrangement of the cylinder boxes G in duplicate on diametrically opposite sides of the frame C. The parts are so adjusted that the piston $F^3$ on one side is at the middle of its stroke when the piston F on the opposite side is at the end of its stroke. In this way the composite effect of both elements of the transmission system is to provide for a substantially uniform torque or effort in the driving action, which is entirely free from any vibrations or pulsations. Another practical feature is the construction of the valve H which I provide with a slot $Z^6$ cut or formed longitudinally on one side thereof. The purpose of this slot is to relieve the pressure of the fluid against the end of the valve when the latter is moved outward (toward the right in Fig. 7). If such a slot or its equivalent is not provided it might happen that difficulty would be encountered in opening the valves after they had been fully closed.

In Fig. 8 a slightly modified construction of valve H is shown and which is made in the form of a hollow casing interiorly threaded at one end $H^6$ and screwed onto a block $H^5$, having an extension $H^2$ threaded at $H^8$ to secure a means of attachment to the yoke $I^1$. $H^7$ designates a pin passed through the valve and through the block $H^5$ so as to hold the parts against working loose from any predetermined position of adjustment.

The construction of the piston F also presents certain features of practical value, and by which a fluid tight engagement is made in spite of wear. $F^2$ designates cup-shaped washers at each end of the piston, and which clamp a pair of leather packing cups $F^3$ between their inner walls and the proximate faces of the piston. The cups $F^2$ have perforations $F^4$ through which the fluid pressure enters and is exerted against the interior of the leather packing cups $F^3$. The result is to maintain the packing cups $F^3$ in tight packing engagement against the walls of the cylinder, which tight engagement is maintained in spite of continuous wear and usage.

The alinement and proper disposition of the driving and driven shafts and their various parts is preserved by a plurality of bearings and collars, as follows: $S^2$ designates a bearing for the shaft S, and $A^8$ designates a bearing for the shaft A. Adjacent to the bearing $A^8$ is a pair of collars $A^{10}$ fixed to the shaft A so as to form a thrust bearing in both directions. $A^7$ denotes a bearing surrounding the sleeve $A^2$ at the location of the junction between the shafts S and A. There is also provided a collar $S^5$ on the shaft S, which coöperates with the bearing $S^2$, and a collar $C^5$ engaging the frame part $C^2$. These collars serve to fix the position of the shaft S and the frame C against endwise movement.

What I claim is:

1. In a transmission system, a driving shaft, a driven shaft, a rotatable two part frame loosely sleeved coaxial with the said shafts, countershafts carried by said frame, pins joining the two parts of said frame, cylinders oscillating on said pins, pistons therein with crank connections with said countershafts, and valves having stems movable parallel to said shafts for varying the resistance to the flow of fluid displaced by said pistons, and gears connecting said driving and driven shafts with said countershaft.

2. In a transmission system, a driving shaft, a driven shaft, a frame loosely sleeved coaxial with said shafts, a countershaft carried by said frame, gears on said driving and driven shafts and on said countershaft, means for locking said gears to cause a direct drive at reduced speed, an additional gear on said countershaft, an idler therefor to cause a reverse drive at reduced speed, and a link extending from said idler to said last mentioned gear to stiffen the relation of the pair.

3. In a transmission system, a driving shaft, a driven shaft, a frame rotatable coaxial with said shafts, a countershaft in said frame, gears, means for locking the same for transmitting rotation therethrough at reduced speed from said driving to said driven shaft through said countershaft, and a brake adapted to tighten on and prevent rotation of said frame.

4. In a transmission system, a driving shaft, a driven shaft, a frame rotatable coaxial with said shafts, a countershaft in said frame, gears for transmitting rotation at reduced speed from said driving to said driven shaft through said countershaft, means for opposing a resistance to the rotation of said countershaft, a brake for resisting rotation of said frame, and means for simultaneously tightening said brake and relieving the resistance to rotation of said countershaft.

In witness whereof I have hereunto signed my name in the presence of two subscribing witnesses.

ROBERT E. LINCOLN.

Witnesses:
SAMUEL ROSS,
THOMAS H. ROSS.